(12) United States Patent
Tanaka et al.

(10) Patent No.: US 12,493,010 B2
(45) Date of Patent: Dec. 9, 2025

(54) GAS SENSOR

(71) Applicant: KOA CORPORATION, Ina (JP)

(72) Inventors: Tetsuro Tanaka, Minowa-Machi (JP); Kenichi Iguchi, Ina (JP); Ken Takahashi, Minowa-Machi (JP); Chika Ito, Ina (JP)

(73) Assignee: KOA Corporation, Ina (JP)

( * ) Notice: Subject to any disclaimer, the term of this patent is extended or adjusted under 35 U.S.C. 154(b) by 329 days.

(21) Appl. No.: 18/206,816

(22) Filed: Jun. 7, 2023

(65) Prior Publication Data

US 2023/0349851 A1  Nov. 2, 2023

Related U.S. Application Data

(62) Division of application No. 17/040,278, filed as application No. PCT/JP2019/011698 on Mar. 20, 2019, now abandoned.

(51) Int. Cl.
| | |
|---|---|
| *G01N 27/12* | (2006.01) |
| *B28B 1/30* | (2006.01) |
| *B28B 1/48* | (2006.01) |
| *G01N 33/00* | (2006.01) |

(52) U.S. Cl.
CPC ............. *G01N 27/125* (2013.01); *B28B 1/30* (2013.01); *B28B 1/48* (2013.01); *G01N 33/0036* (2013.01)

(58) Field of Classification Search
CPC ............. G01N 27/125; G01N 33/0036; G01N 27/4067; G01N 27/12; B28B 1/30; B28B 1/48
See application file for complete search history.

(56) References Cited

U.S. PATENT DOCUMENTS

| | | | |
|---|---|---|---|
| 2003/0146093 A1* | 8/2003 | Akiyama | G01N 27/4071 204/431 |
| 2006/0016272 A1* | 1/2006 | Chang | G01N 3/08 73/818 |
| 2007/0292957 A1 | 12/2007 | Chua et al. | |
| 2016/0273987 A1* | 9/2016 | Masuda | G01L 9/0073 |

(Continued)

FOREIGN PATENT DOCUMENTS

| | | |
|---|---|---|
| EP | 0 826 961 A1 | 3/1998 |
| JP | S52-150696 A | 12/1977 |

(Continued)

OTHER PUBLICATIONS

Okamoto et al., "Characteristics of Oxygen Sensor Exploiting the Hot Spot in BaAl2O4-added GdBa2CuO7-d Composite Ceramic Rod", Journal of the Ceramic Society of Japan, Supplement Journal of the Ceramic Society of Japan, Supplement 112-1, PacRim5 Special Issue. (Year: 2004).

*Primary Examiner* — Fatemeh Esfandiari Nia
(74) *Attorney, Agent, or Firm* — Carrier, Shende & Associates P.C.; Fulchand P. Shende; Joseph P. Carrier

(57) ABSTRACT

A sensor element (12) has a cross-sectional area that continuously only increases from a positive (+) electrode side toward a negative (−) electrode side, thereby leading a hot spot, which attempts to move to the negative electrode side, to a lower resistance side. A position that is at nearly equal distances from paired electrodes (13 and 15) formed on either end of the sensor element (12) is set as a hot spot generating position, so as to avoid damage to the electrodes due to heat emitted by the hot spot.

7 Claims, 9 Drawing Sheets

(56) References Cited

U.S. PATENT DOCUMENTS

2017/0059511 A1    3/2017  Nakagawa et al.
2021/0018456 A1*   1/2021  Ito ...................... G01N 27/128

FOREIGN PATENT DOCUMENTS

| JP | H10-073549 A | 3/1998 |
| JP | 2000-019143 A | 1/2000 |
| JP | 2000-055855 A | 2/2000 |
| JP | 2000-055857 A | 2/2000 |
| JP | 2007-085816 A | 4/2007 |
| JP | 2007-273191 A | 10/2007 |

* cited by examiner

GAS SENSOR

CROSS-REFERENCE TO RELATED APPLICATION

This application is a divisional of the U.S. patent application Ser. No. 17/040,278 filed Sep. 22, 2020, which is a National Stage Entry of International Application PCT/JP2019/011698 filed Mar. 20, 2019, which is based upon and claims the benefit of priority from Japanese Patent Application No. 2018-057303 filed Mar. 23, 2018. The entire subject matter of these priority documents, including specification, claims and drawings thereof, is incorporated by reference herein.

TECHNICAL FIELD

The present invention relates to a gas sensor, which detects gas concentration such as oxygen concentration within a measuring atmosphere.

BACKGROUND ART

An oxygen sensor having an oxygen concentration detecting element made of various materials is well-known. For example, the oxygen sensor using composite ceramics made by mixing $LnBa_2Cu_3O_{7-6}$ and $Ln_2BaCuO_5$ (where Ln denotes rare earth element) is known as the material composition of the oxygen sensor using a ceramic sintered body (see Patent Document 1).

The oxygen sensor using a ceramic sintered body detects oxygen concentration utilizing a hot-spot phenomenon that a part of the linear member (sensor element) is red-heated when a voltage is applied. Such a hot spot-type oxygen sensor is characterized in that $O^{2-}$ ions taken into the crystal structure of an oxygen sensor element travel to the positive electrode. On the other hand, a hot spot generating at this time moves to the negative electrode in which the number of $O^{2-}$ ions have decreased.

Because of these characteristics, control of hot spot generating positions in the oxygen sensor element is impossible. However, according to Patent Document 2, a narrow part formed in the sensor element made of a linear body etc. is used as a hot spot, and thus the hot spot is generated at a specific position of the sensor element. According to Patent Document 3, the central part of the element is formed to be a narrow part, which thus has a smaller cross-sectional area and a larger resistance than the other portions, resulting in generation of a hot spot in the narrow part.

PRIOR ART DOCUMENTS

Patent Documents

Patent Document 1: JP 2007-85816A (U.S. Pat. No. 4,714,867)
Patent Document 2: JP 10-73549A
Patent Document 3: JP 2000-19143A

DISCLOSURE OF THE INVENTION

Problem to be Solved by the Invention

The conventional hot-spot type oxygen sensor described above either has a long and slender rectangular parallelepiped shape with a uniform cross-sectional area, or has the same shape with a narrow part in the central part of the element. Such a sensor material has a problem that generation of a hot spot, which emits intense heat, at a position close to the negative electrode causes remarkable deterioration of the electrode material.

Moreover, according to Patent Documents 2 and 3, either generation of a hot spot at a specific position in the sensor element, or provision of a narrow part in the sensor element so as to ensure generation of the hot spot causes formation of a fragile part in the sensor element, which is a linear member, resulting in degradation of the sensor element in strength. Provision of the narrow part not only makes the manufacturing steps of the sensor element complicated but also causes the oxygen sensor using the sensor element to deteriorate and durability to decrease.

The present invention is devised in light of the problems described above, and aims to provide a gas sensor that allows fixation of a hot spot generating position without generation of fragile parts.

Means of Solving the Problem

The present invention aims to resolve the above problems, and includes the following structure, for example, as means for achieving the above aim. That is, the present invention is a gas sensor characterized in that it is made from a ceramic sintered body for detecting as gas concentration, either change in an electric current value or change in a resistance value measured when a voltage is applied to a sensor element.

The sensor element has a shape in which a cross-sectional area changes from one electrode side toward the other electrode side of paired electrode parts formed on either longitudinal end, where the cross-sectional area continuously only increases or continuously only decreases from the one electrode side toward the other electrode side.

For example, it is characterized in that the sensor element has a constant thickness, and a width that continuously only increases or continuously only decreases from the one electrode side toward the other electrode side. It is also characterized in that, for example, the sensor element has thickness and width increasing or decreasing either uniformly or gradually from the one electrode side toward the other electrode side. It is further characterized in that, for example, of the paired electrode parts, an electrode part formed on a side where cross-sectional area of the sensor element is larger is set as a negative electrode, and an electrode part formed on a side where the cross-sectional area is smaller is set as a positive electrode.

Yet even further, for example, it is characterized in that either both the negative electrode and the positive electrode are formed on the same side of the sensor element, or one of the negative electrode or the positive electrode is formed on an upper surface of the sensor element and the other is formed on an under surface of the sensor element. It is characterized in that, for example, both side surfaces of the sensor element extend linearly along a longitudinal direction between the one electrode side and the other electrode side in a planar view.

It is also characterized in that, for example, the sensor element has a trapezoidal shape in which one edge portion on the one electrode side which is orthogonal to the longitudinal direction is an upper base of the trapezoidal shape, the other edge portion on the other electrode side which is orthogonal to the longitudinal direction is a lower base of the trapezoidal shape, and the both side surfaces between the upper base and the lower base are a pair of legs of the trapezoidal shape where the pair of legs are of equal length.

It is further characterized in that, for example, of the paired electrode parts, an electrode part formed on one side where cross-sectional area of the sensor element is larger has in the longitudinal direction an edge portion which is curved in a planar view.

Results of the Invention

According to the present invention, fixation of the hot spot generating position in a gas sensor prevents deterioration etc. of the electrode due to the hot spot.

DESCRIPTION OF EMBODIMENTS

Figure 1:
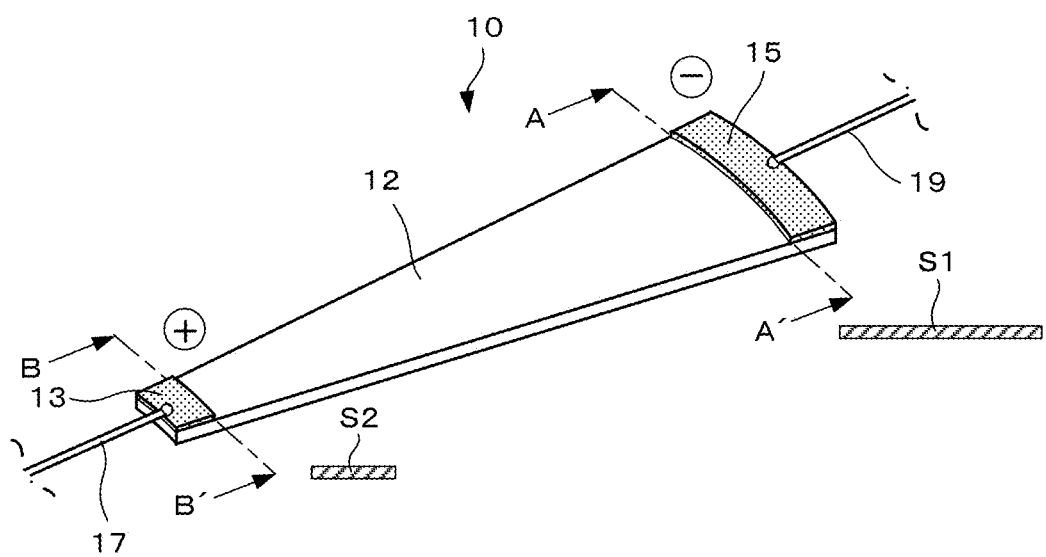
FIG. 1 is an external perspective diagram of an oxygen sensor according to an embodiment of the present invention.

An embodiment according to the present invention is described below in detail with reference to accompanying drawings. Here, an oxygen sensor is described as an example of a gas sensor. FIG. 1 is an external perspective diagram of the oxygen sensor according to the embodiment of the present invention. Note that the oxygen sensor has a structure in which a sensor element is stored inside a tubular body such as a cylindrical glass, made of heat-resistant glass. However, illustration of the tubular body is omitted from the drawing.

The oxygen sensor 10 according to the embodiment shown in FIG. 1 includes a sensor element 12, paired electrodes 13 and 15 formed facing each other at longitudinal ends of the sensor element 12, and lead wires 17 and 19 connected to the respective electrodes 13 and 15.

The sensor element 12 has a shape that the cross-sectional area of the element on one electrode side differs from that of the element on the other electrode side. Specifically, the shape of the cross-sectional area of the sensor element 12 increases uniformly from the positive (+) electrode 13 toward the negative (−) electrode 15.

A ratio of cross-sectional area S1 on the negative electrode side when the sensor element 12 is cut along a line indicated by arrows A-A' of FIG. 1 to cross-sectional area S2 on the positive electrode side when the sensor element 12 is cut along a line indicated by arrows B-B' is set to 1.5:1 to 2:1, for example.

The sensor element 12 is constituted by a ceramic sintered body made by mixing $LnBa_2Cu_3O_{7-\delta}$ and $Ln_2BaCuO_5$, for example. In this chemical composition, Ln denotes rare earth element (for example, Sc (scandium), Y (yttrium), La (lanthanum), Nd (neodymium), Sm (samarium), Eu (europium), Gd (gadolinium), Dy (dysprosium), Ho (holmium), Er (erbium), Tm (thulium), Yb (ytterbium), Lu (lutetium), etc.) Moreover, $\delta$ represents oxygen defect (0 to 1).

Results from comparison of the oxygen sensor according to the embodiment to the conventional oxygen sensor, which is made from a sensor element having a slender, rectangular parallelepiped shape and uniform cross-sectional areas from the positive electrode side to the negative electrode side, are described below. This comparison has been carried out under the following conditions: An oxygen sensor is housed in a cylindrical glass tube made of a heat-resistant glass where conductive caps (mouthpieces) made of metal such as copper (Cu) are fitted to respective ends of the glass tube, the electric conductive caps are connected to a power source, resulting in an electric current passing through the sensor element, and generation of a hot spot is observed.

This observation has shown that with the conventional oxygen sensor, a hot spot has generated in the vicinity of the negative electrode of the sensor element, while with the oxygen sensor according to the embodiment, a hot spot has generated in the central part of the sensor element.

The hot spot generating position in the oxygen sensor according to the embodiment can be considered a position that is at nearly equal distances from the paired electrodes formed on either end of the sensor element. This allows avoiding damage to the electrode due to heat emitted by the hot spot. Moreover, in order to control hot spot generating positions, provision of a narrow part in the sensor element as in the conventional case is not required, thus avoiding formation of a fragile part in the sensor element.

Figure 2:
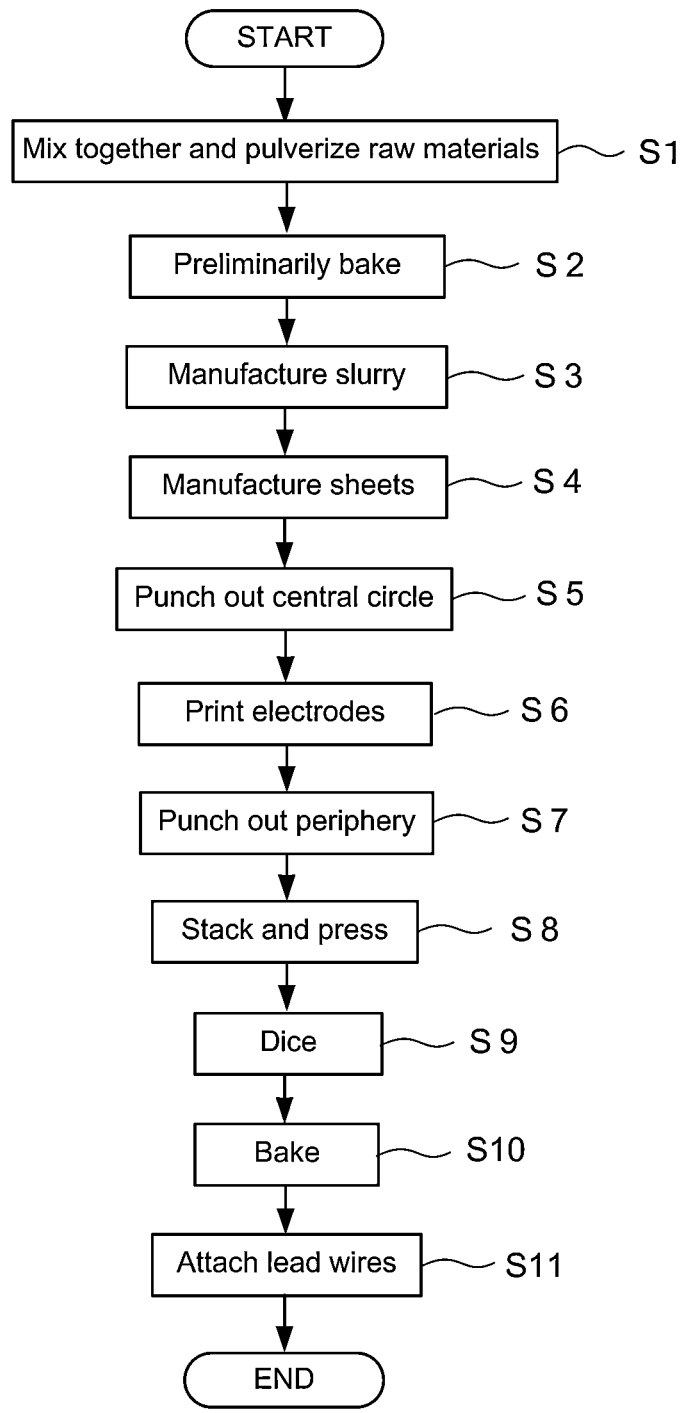
FIG. 2 is a flow chart showing oxygen sensor manufacturing steps in time series according to the embodiment.

A manufacturing method for the oxygen sensor according to the embodiment is described next. FIG. 2 is a flow chart showing oxygen sensor manufacturing steps in time series according to the embodiment. Here, a manufacturing method for the oxygen sensor illustrated in FIG. 1, which has an element structure where shape of the cross-sectional area of the sensor element increases uniformly from the positive electrode toward the negative electrode, is described. Moreover, FIGS. 3A-3E and FIGS. 4A-4C show processing etc. of components corresponding to each manufacturing step for the oxygen sensor of FIG. 2.

In step S1 of FIG. 2, raw materials of the oxygen sensor element are mixed together and pulverized. More specifically, $LnBa_2Cu_3O_{7-\delta}$ and $Ln_2BaCuO_5$ (Ln denotes rare earth element) are mixed together as materials for the oxygen sensor element, and the mixed raw materials are pulverized using a ball mill or the like, resulting in the same sized grains.

In step S2, the materials obtained in the step described above are subjected to heat treatment (preliminary baking) at 900 to 1000° C. In step S3, the preliminarily baked raw materials are pulverized using a ball mill or the like, resulting in the same sized grains, and then slurry is manufactured. Here, a binder resin (e.g., butyral resin (PVB)), a dispersant (e.g., sorbitan trioleate), a plasticizer (e.g., bis phthalate (2-ethylhexyl), DOP), and a diluting solvent (e.g., 2-ethylhexanol) are mixed together with the preliminarily baked materials.

Figure 3A:
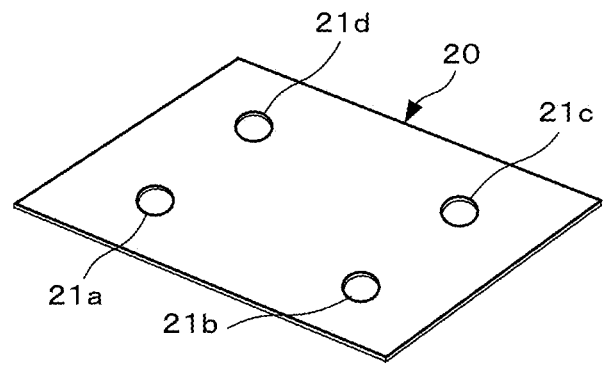
FIGS. 3A-3E show processing etc. of components corresponding to each manufacturing step of FIG. 2.

In step S4, a film is formed using a doctor blade so as to manufacture a green sheet of approximately 10 to 100 μm, for example. In subsequent step S5, as shown in FIG. 3A, central circles 21a to 21d are punched out from a green sheet 20 using a mechanical punch etc.

Figure 3B:
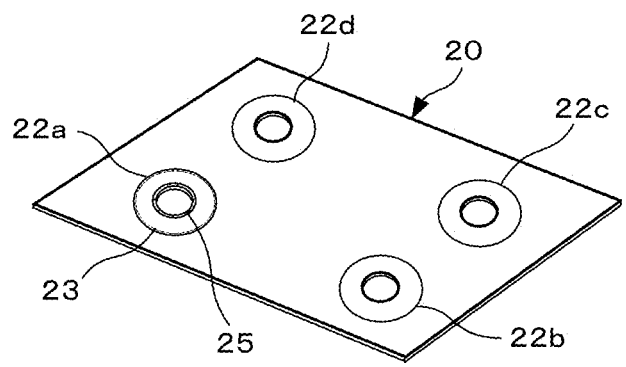

Step S6 includes forming in the same sheet, a ring-shaped green sheet 27a positioned on the top layer of a laminated body described later and ring-shaped green sheets 27b to 27d stacked on the bottom layer thereof, and printing electrodes. More specifically, as shown in FIGS. 3A and 3B, electrode material made of silver (Ag) paste, for example, is screen printed in a ring shape along the inner periphery of the central circle 21a corresponding to the central circle of the ring-shaped green sheet 27a on the top surface of the laminated body, thus forming a positive electrode 25.

Simultaneous to forming the positive electrode, the electrode material is screen printed in a ring shape along an outer periphery 22a, which is at a distance equal to the radius of the ring-shaped green sheet 27a (namely, longitudinal length of the sensor element) from the center of the central circle 21a, thus forming a negative electrode 23. The other central circles 21b to 21d are left punched out without forming any electrodes.

Figure 3C:
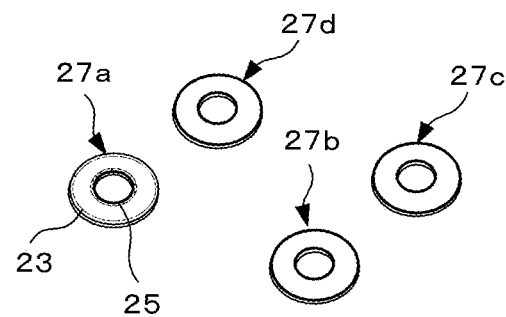

In step S7, the green sheet 20 is punched out using a mechanical punch etc. along outer peripheries 22a to 22d (in the case of the central circle 21a, the outer periphery 22a becomes outer periphery of the negative electrode 23) stipulated at a distance equal to the radius of the ring-shaped green sheet (sensor element length) from the center of each of the central circles 21a to 21d. FIG. 3C illustrates the green sheets (ring-shaped green sheets) 27a to 27d each punched out in a ring shape from the green sheet 20.

Figure 3D:
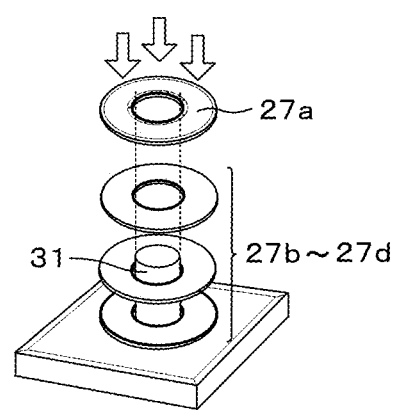
Figure 3E:
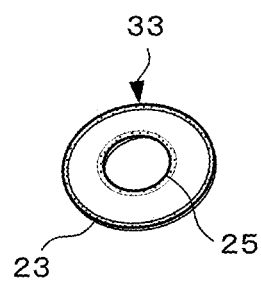

In step S8, the ring-shaped green sheet 27a in which the electrodes 23 and 25 are formed in the inner and outer peripheries respectively is placed on the top part of the ring-shaped green sheets 27b to 27d in which electrodes are not provided, and a rod-like pin 31 is then inserted through center holes of the ring-shaped green sheets, thereby stacking them while aligning them, as illustrated in FIG. 3D. The laminated material of the ring-shaped sheets is then applied pressure using a uniaxial press, for example, thereby manufacturing a laminated body 33 having a predetermined thickness illustrated in FIG. 3E.

Here, the ring-shaped green sheet 27a is stacked on the three ring-shaped green sheets 27b to 27d, which become under layers thereof, thereby manufacturing a laminated body. However, the number of stacked layers is not limited thereto, and a necessary number of ring-shaped green sheets are stacked in accordance with thickness of the laminated body to be manufactured.

Moreover, while the method of forming each ring-shaped green sheet layer in the same sheet has been described, a method of forming together a plurality of the ring-shaped green sheet 27a to be the top surface of the same sheet may be used.

Figure 4A:
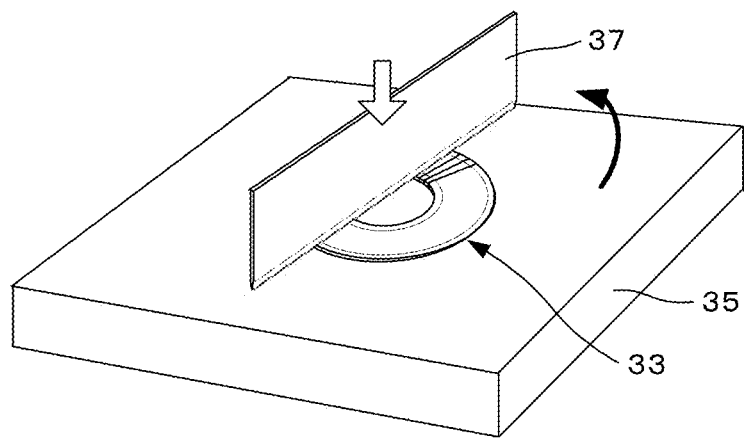
FIGS. 4A-4C show processing etc. of components corresponding to each manufacturing step of FIG. 2.

In step S9, the laminated body 33 is cut (diced) in accordance with product (sensor element) size. Here, as illustrated in FIG. 4A, the laminated body 33 is adhered and fixed on to a guillotine stage 35, and while rotating the guillotine stage 35 around the circle center of the laminated body 33 every fixed angle (e.g., 10° at a time), a cutter 37 is moved a predetermined distance vertically downward, thereby cutting the laminated body 33.

Figure 4B:
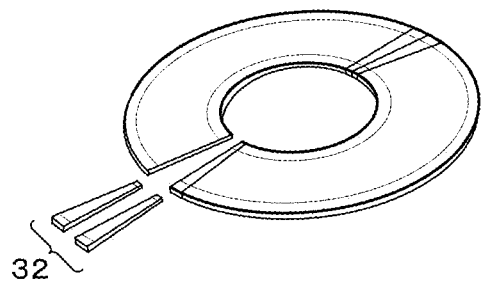

In step S10, the sensor element 32 cut in the dicing step described above and divided into individual pieces as illustrated in FIG. 4B is baked in atmospheric air at, for example, 920° C. for 10 hours. Note that de-binding may be carried out on the laminated body before baking, and annealing may be performed on the laminated body after baking.

Figure 4C:
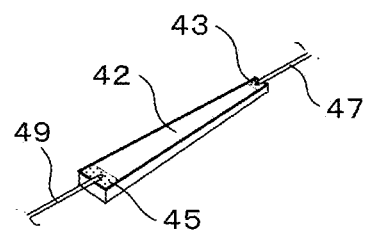

In step S11, lead wires 47 and 49 are attached using a conductive paste, for example, to the positive electrode 43 and the negative electrode 45 of the sensor element 42 after baking, respectively, as illustrated in FIG. 4C. The method of attaching the lead wires is not limited to the above description. For example, instantly heating a joint using a pulse heat power source so as to solder or weld, or wire bonding through ultrasonic vibration or thermocompression bonding may be used.

The length of the sensor element divided into individual pieces and baked as described above is 5 mm, for example, and the outer dimensions (size) of the oxygen sensor include, for example, a glass tube diameter of 5 mm, glass tube length of 20 mm, and air hole diameter of 2.5 mm. As a result, provision of the sensor element with the dimensions described above makes the oxygen sensor exchangeable via the air holes of the glass tube, for example.

Note that while with the oxygen sensor 10 illustrated in FIG. 1, the paired electrodes 13 and 15 are formed on either end of the same surface (upper surface) in the longitudinal direction of the sensor element 12, paired electrodes may be formed on an upper surface of one end of the sensor element 12, and on an under surface of the other end of the sensor element 12.

Moreover, while both side surfaces in the axial direction of the oxygen sensor 10 of FIG. 1 extend linearly between the positive electrode and the negative electrode in a planar view, the sensor is not limited thereto. As long as a condition that the cross-sectional area between both electrodes of the sensor element increases uniformly is satisfied, any one of shapes in which: either both side surfaces between the positive electrode and the negative electrode change into a curved form, or one side surface changes into a curved form and the other side surface changes linearly, in a planar view, may be used.

As described above, the hot spot-type sensor element has a high resistance value on the opposite side to the travelling direction of $O^{2-}$ ions, that is, the negative electrode side including a decreased number of $O^{2-}$ ions. Therefore, the oxygen sensor according to the embodiment has the cross-sectional area with a shape that increases uniformly from the positive (+) electrode side toward the negative (−) electrode side, and the hot spot attempting to move to the negative electrode side may thus be led to a lower resistance side.

As a result, a position that is at nearly equal distances from paired electrodes formed on either end of the sensor element may be a hot spot generating position, and prevention of damage to electrodes from heat emitted from a hot spot as the hot spot approaches the electrode and prevention of generation of cracks in a sensor element etc. caused by thermal stress due to thermal expansion are possible.

Furthermore, due to making the cross-sectional area of the sensor element increase uniformly from the positive electrode toward the negative electrode, the negative electrode may be made larger in size than the positive electrode. As a result, even in the case where concentration of $O^{2-}$ ions in the sensor element has changed, causing a hot spot to move to the negative electrode side, more effective heat radiation is facilitated on the negative side of the sensor element. Due to such heat radiation effect, the hot spot generating position may be kept away from the negative electrode side so as to be at a position nearly equal from both electrodes.

The oxygen sensor according to the present invention is not limited to the embodiment described above, and various modifications are possible. Modified examples are described below.

Modified Example 1

While a sensor element is obtained by dicing (cutting) a ring-shaped green sheet and dividing into individual pieces according to the embodiment described above, the shape of the green sheet before cutting is not limited to a ring shape.

Figure 5A:
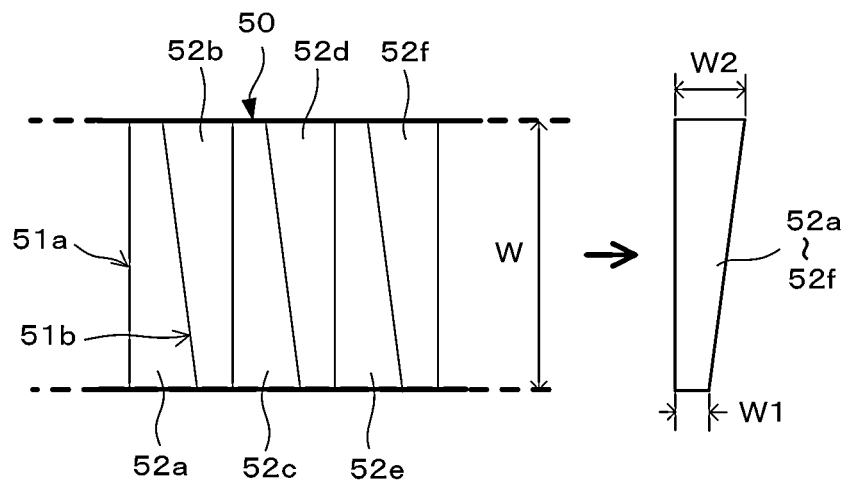
FIGS. 5A-5B show examples of manufacturing sensor elements according to Modified Example 1.
Figure 5B:
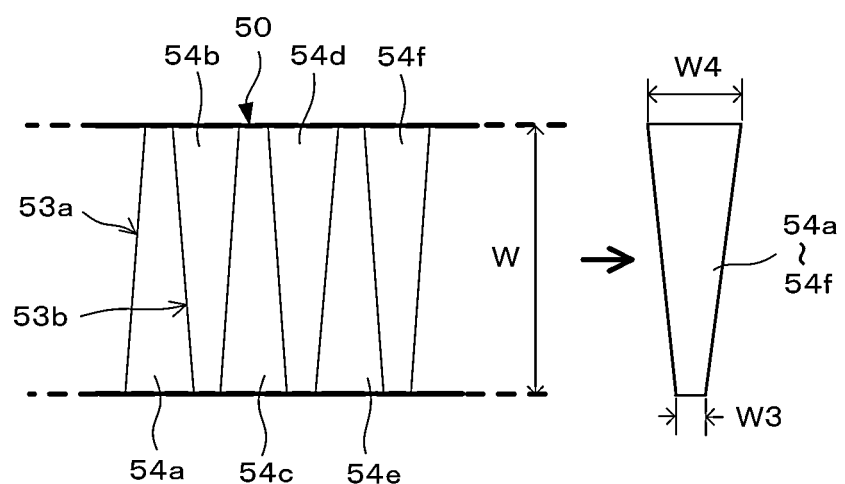

As Modified Example 1, FIGS. 5A and 5B show examples of manufacturing sensor elements by dicing a green sheet having a belt-like shape.

That is, in the examples illustrated in FIGS. 5A and 5B, a long green sheet 50 having width W in accordance with a longitudinal dimension (length in the longitudinal direction) of a sensor element is prepared, and the long green sheet 50 is cut along cutting lines in its width direction.

In FIG. 5A, the long green sheet 50 is diced along cutting lines 51a running in the width direction of the long green sheet 50 and cutting lines 51b running diagonally in the width direction. This allows manufacture of sensor elements 52a to 52f having shape of: the cross-sectional area thereof increasing uniformly from the one end toward the other end, and width W1 on the one end side smaller than width W2 on the other end side.

Meanwhile, FIG. 5B illustrates an example of dicing the long green sheet 50 along two cutting lines 53a and 53b running diagonally in the width direction of the long green sheet 50. This allows manufacture of sensor elements 54a to 54f having shape of: the cross-sectional area thereof increasing uniformly from the one end toward the other end, and width W3 on the one end side smaller than width W4 on the other end side.

Modified Example 2

Figure 6A:
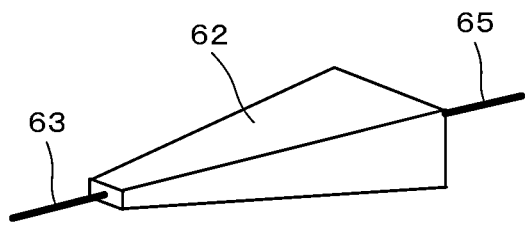
FIGS. 6A-6B show external perspective diagrams of sensor elements according to Modified Example 2.

As long as a condition that the cross-sectional area of the sensor elements increases uniformly from the one end toward the other end is satisfied, the overall shape is not limited to a planar shape, as with the sensor element illustrated in FIG. 1 etc. As Modified Example 2, a sensor element 62 illustrated in FIG. 6A has an overall pyramid shape in which one end bottom surface has a smaller area than the other end bottom surface. In this example, lead lines 63 and 65 are attached to respective electrodes (omitted from the drawing) arranged on the one end bottom surface and the other end bottom surface.

Figure 6B:
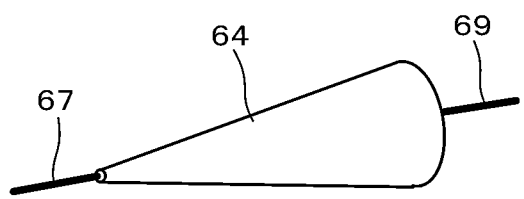

A sensor element 64 illustrated in FIG. 6B has an overall cone shape in which the one end bottom surface has a smaller area than the other end bottom surface. In this example as well, lead lines 67 and 69 are attached to respective electrodes, which are omitted from the drawing, arranged on the one end bottom surface and the other end bottom surface.

Modified Example 3

Figure 7A:
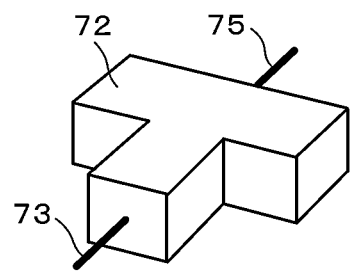
FIGS. 7A-7B show planar views of sensor elements according to Modified Example 3.

Examples where the cross-sectional area of the sensor element increases in a stepwise fashion are described as Modified Example 3. FIG. 7A is an example where shape of a sensor element 72 is a T shape in a planar view. With the sensor element 72, cross-sectional area increases gradually or stepwisely from one side on which a lead wire 73 is attached, toward another side on which a lead wire 75 is attached.

Figure 7B:
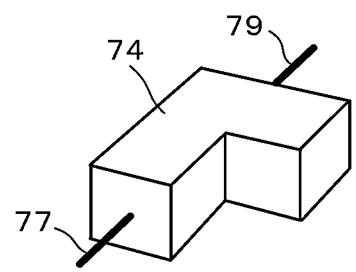

FIG. 7B is an example where shape of a sensor element 74 is an L shape in a planar view. In this example as well, cross-sectional area increases gradually or stepwisely from one side on which a lead wire 77 is attached, toward another side on which a lead wire 79 is attached.

Figure 8A:
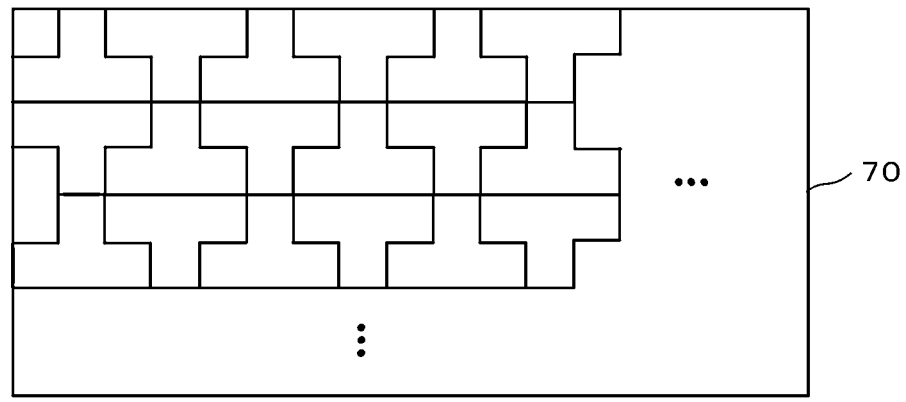
FIGS. 8A-8B show example patterns of punching out sensor elements according to Modified Example 3 from a green sheet.
Figure 8B:
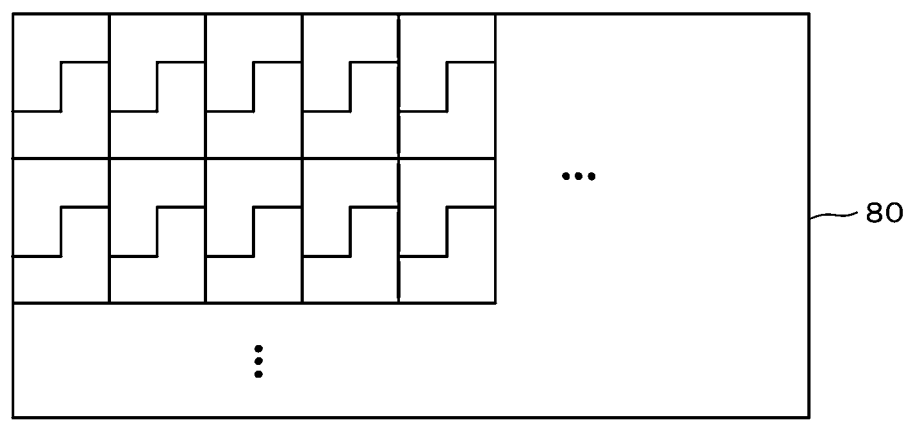

Note that FIG. 8A illustrates an example punch-out pattern in the case of punching out a plurality of the T-shaped sensor element 72 of FIG. 7A from a single green sheet 70. Moreover, FIG. 8B shows an example punch-out pattern in the case of punching out a plurality of the L-shaped sensor element 74 of FIG. 7B from a single green sheet 80. In either example, the number of sensor elements formed in a single green sheet may be maximized.

Modified Example 4

Figure 9A:
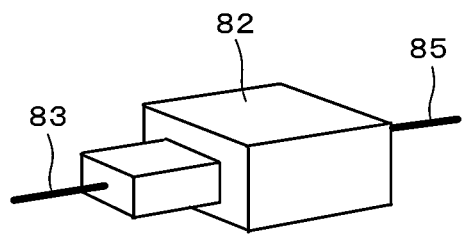
FIGS. 9A-9B show external perspective diagrams of sensor elements according to Modified Example 4.

While examples of gradually increasing the cross-sectional area of planar sensor elements are described in Modified Example 3, sensor elements each having a three-dimensional shape where cross-sectional area increases gradually or stepwisely are described as Modified Example 4. For example, a sensor element 82 of FIG. 9A has a shape in which two rectangular parallelepipeds having differing cross-sectional areas are connected. Moreover, lead wires 83 and 85 are attached to either end surface of the sensor element 82.

Figure 9B:
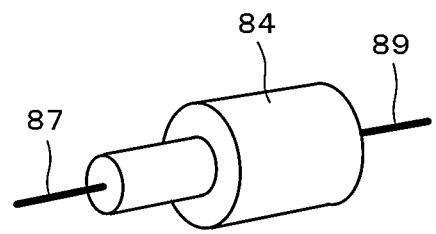

On the other hand, a sensor element 84 of FIG. 9B has a shape in which two cylinders having differing cross-sectional areas are connected. Lead wires 87 and 89 are attached to either end surface of the sensor element 84. Accordingly, the cross-sectional area of the sensor element increases gradually or stepwisely from one end to the other end, even with the sensor element 82 of FIG. 9A and the sensor element 84 of FIG. 9B.

EXPLANATION OF REFERENCES

10: Oxygen sensor
12, 42, 52a-52f, 54a-54f, 62, 64, 72, 74, 82, 84: Sensor element
13, 15, 43, 45: Electrode
17, 19, 47, 49, 63, 65, 67, 69, 73, 75, 87, 89: Lead wire
21a-21d: Central circle
22a-22d: Periphery
23: Negative electrode
25: Positive electrode
27a-27d: Ring-shaped green sheet
31: Rod-like pin
33: Laminated body
50: Long green sheet
70, 80: Green sheet

The invention claimed is:

1. A gas sensor made from a ceramic sintered body for detecting a gas concentration, either change in an electric current value or change in a resistance value measured when a voltage is applied to a sensor element, wherein
the sensor element has a shape in which a cross-sectional area changes from one electrode side toward the other electrode side of paired electrode parts formed on either longitudinal end, where the cross-sectional area continuously only increases or continuously only decreases from the one electrode side toward the other electrode side.

2. The gas sensor according to claim 1, wherein the sensor element has a constant thickness, and a width that continuously only increases or continuously only decreases from the one electrode side toward the other electrode side.

3. The gas sensor according to claim 2, wherein of the paired electrode parts, an electrode part formed on one side where cross-sectional area of the sensor element is larger is set as a negative electrode, and an electrode part formed on another side where the cross-sectional area is smaller is set as a positive electrode.

4. The gas sensor according to claim 3, wherein either both the negative electrode and the positive electrode are formed on an upper surface or a lower surface of the sensor element, or one of the negative electrode or the positive electrode is formed on the upper surface of the sensor element and the other is formed on the lower surface of the sensor element.

5. The gas sensor according to claim 1, wherein both upper and lower surfaces of the sensor element extend linearly along a longitudinal direction between the one electrode side and the other electrode side in a planar view.

6. The gas sensor according to claim 5, wherein the sensor element has a trapezoidal shape in which one edge portion on the one electrode side which is orthogonal to the longitudinal direction is an upper base of the trapezoidal shape, the other edge portion on the other electrode side which is orthogonal to the longitudinal direction is a lower base of the trapezoidal shape, and the both side surfaces between the upper base and the lower base are a pair of legs of the trapezoidal shape where the pair of legs are of equal length.

7. The gas sensor according to claim 5, wherein of the paired electrode parts, an electrode part formed on one side where cross-sectional area of the sensor element is larger has in the longitudinal direction an edge portion which is curved in a planar view.

* * * * *